United States Patent
Deguchi et al.

(10) Patent No.: US 8,221,922 B2
(45) Date of Patent: Jul. 17, 2012

(54) NON-AQUEOUS ELECTROLYTE SECONDARY BATTERY

(75) Inventors: Masaki Deguchi, Hyogo (JP); Tooru Matsui, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 487 days.

(21) Appl. No.: 12/443,799

(22) PCT Filed: Apr. 10, 2008

(86) PCT No.: PCT/JP2008/000941
§ 371 (c)(1),
(2), (4) Date: Mar. 31, 2009

(87) PCT Pub. No.: WO2008/132792
PCT Pub. Date: Nov. 6, 2008

(65) Prior Publication Data
US 2010/0015533 A1      Jan. 21, 2010

(30) Foreign Application Priority Data
Apr. 12, 2007    (JP) .................................. 2007-104514

(51) Int. Cl.
*H01M 6/16* (2006.01)
(52) U.S. Cl. ..................... 429/330; 429/332; 429/231.1; 429/231.3; 429/247; 429/234; 429/218.1
(58) Field of Classification Search .................. 429/330, 429/332, 231.1, 231.3, 247, 234, 218.1
See application file for complete search history.

(56) References Cited

U.S. PATENT DOCUMENTS

| | | | |
|---|---|---|---|
| 5,718,989 A | 2/1998 | Aoki et al. | |
| 5,795,558 A | 8/1998 | Aoki et al. | |
| 6,447,958 B1 | 9/2002 | Shinohara et al. | |
| 6,589,694 B1 | 7/2003 | Gosho et al. | |
| 6,866,964 B2 * | 3/2005 | Nakahara et al. | 429/213 |
| 7,169,510 B2 * | 1/2007 | Awano et al. | 429/330 |
| 2002/0127476 A1 | 9/2002 | Teshima et al. | |
| 2005/0100782 A1 | 5/2005 | Iijima et al. | |
| 2006/0019154 A1 | 1/2006 | Imachi et al. | |
| 2006/0281006 A1 | 12/2006 | Fujino et al. | |

(Continued)

FOREIGN PATENT DOCUMENTS

CN        1156910 A        8/1997

(Continued)

OTHER PUBLICATIONS

Chinese Office Action issued in Chinese Patent Application No. 200880001215.8, dated Mar. 7. 2011.

*Primary Examiner* — Laura Weiner
(74) *Attorney, Agent, or Firm* — McDermott Will & Emery LLP

(57) ABSTRACT

A non-aqueous electrolyte secondary battery including: a positive electrode that contains a transition metal oxide capable of absorbing and desorbing lithium ions; a negative electrode that is capable of absorbing and desorbing lithium ions; a porous film that is interposed between the positive electrode and the negative electrode; and a non-aqueous electrolyte, wherein at least one selected from inorganic oxide and polyamide is contained in the porous film, and 5 to 15 vol % of ethylene carbonate is contained in a non-aqueous solvent that is contained in the non-aqueous electrolyte.

9 Claims, 2 Drawing Sheets

U.S. PATENT DOCUMENTS

2007/0072074 A1 3/2007 Yamamoto et al.

FOREIGN PATENT DOCUMENTS

| | | |
|---|---|---|
| CN | 1362752 A | 8/2002 |
| CN | 1725524 A | 1/2006 |
| CN | 1816923 A | 8/2006 |
| CN | 1941493 A | 4/2007 |
| EP | 1 052 716 A2 | 11/2000 |
| EP | 1 528 617 A2 | 5/2005 |
| JP | 07-220759 | 8/1995 |
| JP | 10-214640 | 8/1998 |
| JP | 2000-030686 | 1/2000 |
| JP | 2001-052682 | 2/2001 |
| JP | 2001-266949 | 9/2001 |
| JP | 2005-135895 | 5/2005 |
| JP | 2006-173138 | 6/2006 |
| JP | 2006-269438 | 10/2006 |

* cited by examiner

NON-AQUEOUS ELECTROLYTE SECONDARY BATTERY

RELATED APPLICATIONS

This application is the U.S. National Phase under 35 U.S.C. §371 of International Application No. PCT/JP2008/000941, filed on Apr. 10, 2008, which in turn claims the benefit of Japanese Application No. 2007-104514, filed on Apr. 12, 2007, the disclosures of which Applications are incorporated by reference herein.

TECHNICAL FIELD

The present invention relates to a non-aqueous electrolyte secondary battery, and more particularly to an improvement in the storage characteristics of the same.

BACKGROUND ART

In recent years, studies have been actively conducted on non-aqueous electrolyte secondary batteries, lithium ion secondary batteries in particular, which provide a high voltage and a high energy density. A non-aqueous electrolyte secondary battery generally employs a transition metal oxide, such as $LiCoO_2$, as the positive electrode active material, a carbon material as the negative electrode active material, and a porous sheet made of polyethylene, polypropylene or the like as the separator.

Generally, a non-aqueous electrolyte contains a non-aqueous solvent and a lithium salt dissolved in the non-aqueous solvent. As the non-aqueous solvent, a cyclic carbonic acid ester, chain carbonic acid ester, cyclic carboxylic acid ester and the like can be used. As the lithium salt, lithium hexafluorophosphate ($LiPF_6$), lithium tetrafluoroborate ($LiBF_4$) and the like can be used.

From the viewpoint of further improving the battery characteristics of non-aqueous electrolyte secondary batteries, various improvements have been made to positive electrode active materials, negative electrode active materials, separators, non-aqueous electrolytes, and so on.

For example, Patent Document 1 discloses a proposal in which a porous film containing an inorganic oxide and a binder is carried on the active material layer of an electrode. With this proposal, separation of the active material from the electrode during production of the battery and reattachment of the separated active material to the electrode are suppressed. Accordingly, it is possible to prevent internal short circuiting from occurring in the battery.

Patent Document 2 also discloses a proposal in which a porous film containing an inorganic oxide and a binder is carried on the active material layer of an electrode. The porous film adsorbs free acids produced in the non-aqueous electrolyte. Consequently, the action of the free acids prevents the positive electrode active material from being dissolved, improving the cycle characteristics and storage characteristics of the lithium ion secondary battery.

Patent Document 3 discloses a proposal to use a separator in which a porous sheet and a layer that contains a heat resistant nitrogen-containing aromatic polymer such as aramid and a ceramic powder are laminated. With this proposal, both shut-down properties and heat resistance can be achieved, improving battery safety.

Patent Document 1: Japanese Laid-Open Patent Publication No. Hei 7-220759
Patent Document 2: Japanese Laid-Open Patent Publication No. Hei 10-214640
Patent Document 3: Japanese Laid-Open Patent Publication No. 2000-30686

DISCLOSURE OF THE INVENTION

Problem To be Solved by the Invention

However, the degree to which the dissolution of positive electrode active material (that is, a transition metal oxide) is suppressed by means of a porous film containing an inorganic oxide or a separator containing aramid as described above is limited. Under high temperature storage conditions, in particular, metal cations leach out intensely from the positive electrode. The leached metal cations deposit on the negative electrode, increasing the impedance of the negative electrode. Also, the leached metal cations cause clogging of the separator, decreasing the rate characteristics of the battery after storage.

In view of the above, it is an object of the present invention to provide a non-aqueous electrolyte secondary battery that can suppress reduction of the rate characteristics of the battery after high temperature storage and that has superior storage characteristics.

Means for Solving the Problem

The present invention relates to a non-aqueous electrolyte secondary battery including: a positive electrode that contains a transition metal oxide capable of absorbing and desorbing lithium ions; a negative electrode that is capable of absorbing and desorbing lithium ions; a porous film that is interposed between the positive electrode and the negative electrode; and a non-aqueous electrolyte; wherein the non-aqueous electrolyte contains a non-aqueous solvent and a lithium salt that is dissolved in the non-aqueous solvent, and the non-aqueous solvent contains 5 to 15 vol % of ethylene carbonate.

The non-aqueous electrolyte secondary battery of the present invention may or may not include a separator that is interposed between the positive electrode and the negative electrode. As the separator, for example, a porous resin sheet can be used.

The porous film contains at least one selected from the group consisting of inorganic oxide and polyamide.

When the porous film contains an inorganic oxide, it is preferable that the porous film is carried on at least one of the positive electrode and the negative electrode, and it is more preferable that the porous film is carried on the positive electrode.

When the porous film contains a polyamide, it is preferable that the porous film is carried on the separator.

It is preferable that the non-aqueous solvent contains sulfolane.

It is preferable that the non-aqueous solvent contains fluoroethylene carbonate.

It is preferable that the lithium salt contains at least lithium bis(pentafluoroethane sulfonyl)imide.

It is preferable that the transition metal oxide contained in the positive electrode is represented by a general formula: $Li_xNi_{1-y}M_yO_z$, where M includes Co and Al, and $0 \leq x \leq 1.2$, $0.1 \leq y \leq 0.3$ and $2 \leq z \leq 2.3$ are satisfied.

Effect of the Invention

According to the present invention, it is possible to provide a non-aqueous electrolyte secondary battery with superior storage characteristics and, in particular, reduction of the rate characteristics of the battery after high temperature storage can be suppressed.

BEST MODE FOR CARRYING OUT THE INVENTION

A non-aqueous electrolyte secondary battery of the present invention includes a porous film that is interposed between a positive electrode and a negative electrode, and a non-aqueous electrolyte containing a non-aqueous solvent and a lithium salt dissolved in the non-aqueous solvent; one of the features being that the non-aqueous solvent contains 5 to 15 vol % of ethylene carbonate (EC).

When the porous film contains an inorganic oxide, as a result of the interaction between the inorganic oxide and the non-aqueous electrolyte containing an appropriate amount of EC, leaching of metal cations from the positive electrode during high temperature storage of the battery can be suppressed, and reduction of the rate characteristics of the battery after storage can be suppressed. The reason for this is considered as follows.

EC has a high dielectric constant and a high polarity. In other words, the oxygen atoms of the carbonyl groups contained in EC have a high electron density.

When the porous film contains an inorganic oxide, the oxygen atoms of the inorganic oxide also have a high electron density. Accordingly, when EC is present in the porous film, the oxygen atoms contained in the inorganic oxide and the oxygen atoms of the carbonyl groups contained in EC form metal cation trapping sites.

Figure 1:
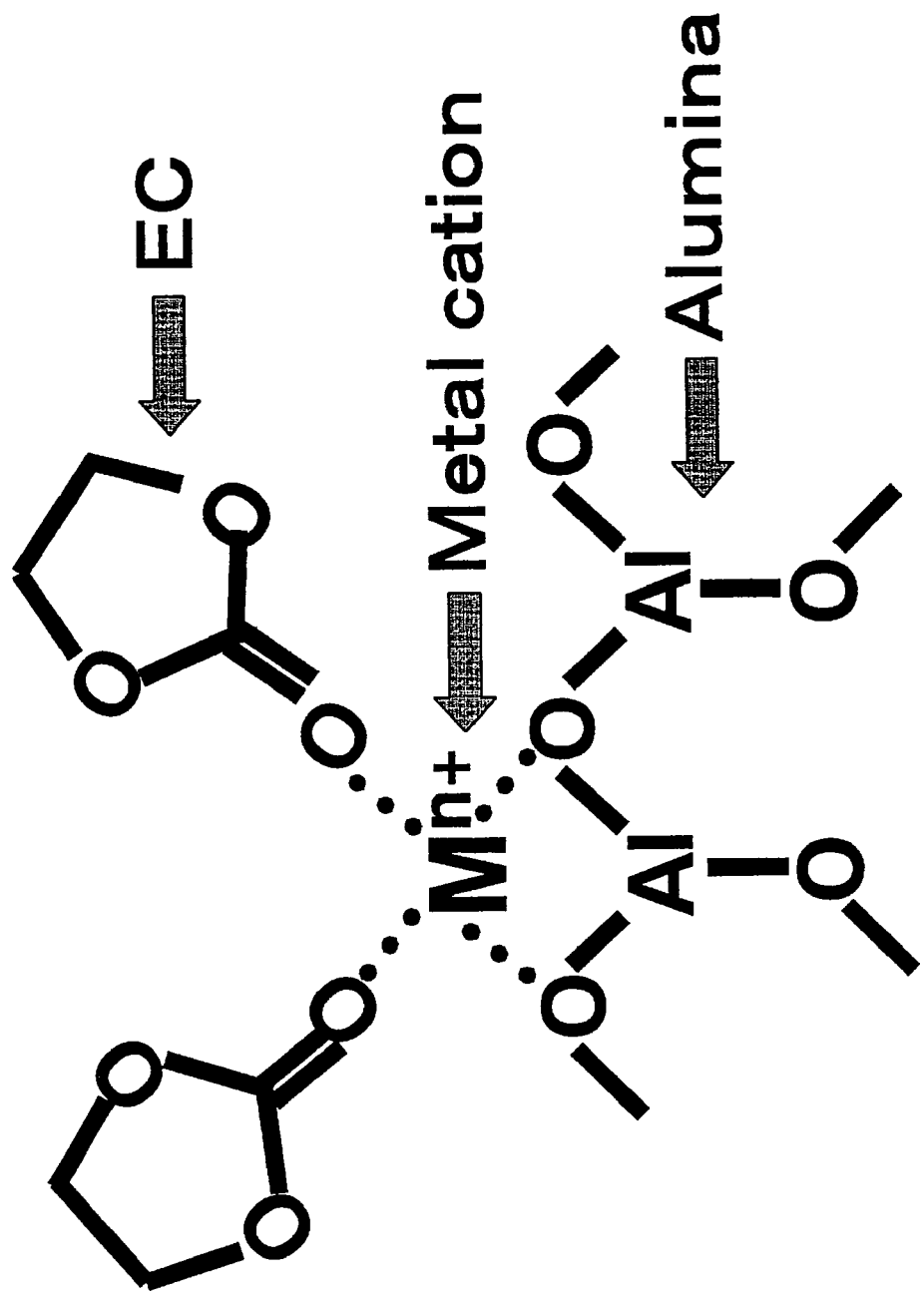
FIG. 1 is a conceptual diagram illustrating a state in which a metal cation is trapped by the oxygen atoms contained in an inorganic oxide and the oxygen atoms of the carbonyl groups contained in EC.

FIG. 1 shows, as an example, a state in which a metal cation ($M^{n+}$) is trapped by the oxygen atoms of EC and the oxygen atoms of alumina. As shown, a metal cation with a low electron density is easily trapped in an area surrounded by oxygen atoms with a high electron density. As a result of this, when the battery is stored under high temperature conditions, the metal cations leached out from the positive electrode active material are trapped in the porous film containing an inorganic oxide. Accordingly, it is possible to prevent the metal from depositing on the negative electrode.

Next, the case in which the porous film contains a polyamide will be described. When the porous film contains a polyamide, as is the case with the porous film containing an inorganic oxide, as a result of the interaction between the amide groups contained in the polyamide and the non-aqueous electrolyte containing an appropriate amount of EC, leaching of metal cations from the positive electrode during high temperature storage of the battery can be suppressed, and reduction of the rate characteristics of the battery after storage can be suppressed. The reason for this is considered as follows.

When the porous film contains a polyamide, the oxygen atoms of the amide groups contained in the polyamide have an electron density as high as that of the oxygen atoms of an inorganic oxide. Accordingly, when EC is present in the porous film, the oxygen atoms of the amide groups contained in the polyamide and the oxygen atoms of the carbonyl groups contained in EC form metal cation trapping sites.

As a result of this, even when the battery is stored under high temperature conditions, the metal cations leached out from the positive electrode active material will be trapped in the porous film containing a polyamide. Accordingly, it is possible to prevent the metal from depositing on the negative electrode.

However, in order to obtain the effects as described above, it is necessary to strictly control the amount of EC contained in the non-aqueous electrolyte. EC has, due to its high viscosity and high polarity, low wettability for the binder and polyamide contained in the porous film. Accordingly, when the amount of EC contained in the non-aqueous electrolyte is too large, the wettability between the porous film and the non-aqueous electrolyte decreases, voltage increases locally in the electrodes. To avoid this, it is necessary for the non-aqueous electrolyte to improve wettability for the binder and polyamide contained in the porous film by including a compound having a polarity lower than that of EC in the non-aqueous solvent.

As the compound having a polarity lower than that of EC, for example, a chain carbonic acid ester can be used. Examples of such a chain carbonic acid esters include diethyl carbonate (DEC), ethyl methyl carbonate (EMC), dimethyl carbonate (DMC), and the like. The content of chain carbonic acid ester in the whole non-aqueous solvent is preferably 80 to 95 vol %, and more preferably 90 to 95 vol % because the effect of improved wettability of the non-aqueous solvent for the binder and polyamide increases.

According to Patent Document 1, the non-aqueous electrolyte contains a mixture of propylene carbonate (PC) and diethyl carbonate (DEC) mixed at a volume ratio of 1:1, but not contain EC. PC is a cyclic carbonate, the same as EC. However, the electron density of the oxygen atoms contained in PC is lower than that of the oxygen atoms contained in EC. Accordingly, it is believed that the effectiveness of PC in trapping metal cations is smaller as compared to EC.

According to Patent Document 2, the non-aqueous electrolyte contains a mixture of EC and DEC mixed at a volume ratio of 1:2. Likewise, according to Patent Document 3, the non-aqueous electrolyte contains a mixture of EC, DMC and EMC mixed at a weight ratio of 30:35:35. In all of these non-aqueous electrolytes, the EC content is too large. When the amount of EC in the non-aqueous electrolyte is too large, the polarity of the non-aqueous solvent increases. As a result of this, the viscosity of the non-aqueous electrolyte increases, and the wettability between the non-aqueous electrolyte and the binder and polyamide decreases.

The EC content in the whole non-aqueous solvent should be 5 to 15 vol %. When the EC content is 15 vol % or less, good wettability between the non-aqueous solvent and the binder or polyamide is obtained, and sufficient wettability between the non-aqueous electrolyte and the porous film is obtained as well. Accordingly, a local voltage increase in the battery is suppressed. In addition, because a sufficient amount of non-aqueous electrolyte enters the porous film, a sufficient number of metal cation trapping sites are formed by the EC and the inorganic oxide or by the EC and the amide groups. Accordingly, the number of metal cations that leach out from the positive electrode under high temperature conditions is reduced.

That is, because the non-aqueous electrolyte has superior wettability for the porous film, a sufficient number of EC molecules enter the porous film. As a result of this, metal cations that have leached out from the positive electrode are efficiently trapped in the battery under high temperature storage conditions. Accordingly, increase of impedance of the negative electrode is suppressed, and reduction of the rate characteristics of the battery after high temperature storage can be suppressed.

When the EC content in the whole non-aqueous solvent is less than 5 vol %, the number of EC molecules present in the porous film decreases. This makes it difficult for the porous film to sufficiently trap metal cations that have leached out from the positive electrode under high temperature storage conditions. Accordingly, the rate characteristics of the battery after high temperature storage decrease. Conversely, when the EC content exceeds 15 vol %, the viscosity of the non-aqueous electrolyte increases, and the wettability between the non-aqueous electrolyte and the porous film becomes insufficient. As a result of this, voltage increases locally in a portion where an insufficiently wet area of the porous film and the electrode make contact, so cycle characteristics decrease. From the viewpoint of achieving a particularly good balance between the effect of trapping metal cations and the wettability of the non-aqueous electrolyte for the porous film, it is more preferable that the EC content in the whole non-aqueous solvent is 5 to 10 vol %.

It is preferable that the non-aqueous solvent contains sulfolane. When the battery is stored under high temperature conditions with its battery voltage exceeding 4.2 V, normally, oxidation and decomposition of the non-aqueous solvent proceed vigorously. As a result of this, a large number of metal cations that the porous film cannot trap may leach out from the positive electrode. Although the details are not known, it is believed that the non-aqueous solvent, when oxidized and decomposed, releases electrons, and metal cations contained in the positive electrode in a high oxidation state receive the electrons and are reduced. As a result, the metal cations become a low oxidation state, and they leach into the non-aqueous electrolyte.

When the non-aqueous electrolyte contains sulfolane, even when a battery with a high voltage is stored, the oxidation and decomposition of the non-aqueous solvent is suppressed, and the leaching of metal cations is suppressed. This is because sulfolane is highly resistant to oxidation. The oxygen atoms of the $SO_2$ groups contained in sulfolane also have a high electron density. Accordingly, areas surrounded by the oxygen atoms of the $SO_2$ groups and the oxygen atoms of the inorganic oxide or polyamide contained in the porous film also can trap leached metal cations. Consequently, the effect of preventing metal cations from depositing on the negative electrode increases as well.

From the viewpoint of achieving a particularly good balance between the effect of trapping metal cations and the wettability of the non-aqueous electrolyte for the porous film, the sulfolane content in the whole non-aqueous solvent is preferably 5 to 15 vol %, and more preferably 5 to 10 vol %. In this case, the chain carbonic acid ester content in the whole non-aqueous solvent is preferably 80 to 90 vol %.

It is preferable that the non-aqueous solvent contains fluoroethylene carbonate. Fluoroethylene carbonate has high wettability for the binder and polyamide contained in the porous film. Accordingly, the addition of a small amount of fluoroethylene carbonate to the non-aqueous solvent makes it difficult for a local voltage increase in the electrodes to occur, and the number of leached metal cations is reduced. Furthermore, fluoroethylene carbonate, when reduced at the negative electrode, forms a good coating film. As a result of this, it is possible to suppress metal cations that have leached out from the positive electrode from depositing on the negative electrode.

The fluoroethylene carbonate content in the whole non-aqueous solvent is preferably 1 to 10 vol %, and more preferably, 2 to 5 vol % from the viewpoint of obtaining the effect of improved wettability of the non-aqueous electrolyte for the binder and polyamide contained in the porous film. When the fluoroethylene carbonate content is too large, the coating film formed on the negative electrode by reduction becomes thick, which may cause an increase in impedance and a decrease in rate characteristics.

The non-aqueous solvent may contain a cyclic carbonic acid ester other than EC, cyclic carboxylic acid ester, or the like from the viewpoint of improving the thermal stability of the non-aqueous electrolyte.

Examples of cyclic carbonic acid esters other than EC include propylene carbonate (PC), butylene carbonate (BC), and the like. The amount of a cyclic carbonic acid ester other than EC contained is, for example, 10 vol % or less in the non-aqueous solvent.

Examples of cyclic carboxylic acid esters include γ-butyrolactone (GBL), γ-valerolactone (GVL), and the like. The cyclic carboxylic acid ester content is, for example, 10 vol % or less in the non-aqueous solvent.

It is preferable that the non-aqueous solvent contains a cyclic carbonic acid ester that has at least one carbon-carbon unsaturated bond. Such a cyclic carbonic acid ester that has at least one carbon-carbon unsaturated bond decomposes on the negative electrode and forms a coating film having a high lithium ion conductivity. Accordingly, the charge/discharge efficiency of the battery is improved.

Examples of a cyclic carbonic acid ester that has at least one carbon-carbon unsaturated bond include vinylene carbonate (VC), 3-methylvinylene carbonate, 3,4-dimethylvinylene carbonate, 3-ethylvinylene carbonate, 3,4-diethyl vinylene carbonate, 3-propylvinylene carbonate, 3,4-dipropylvinylene carbonate, 3-phenyl vinylene carbonate, 3,4-diphenyl vinylene carbonate, vinylethylene carbonate (VEC), divinylethylene carbonate, and the like. They may be used alone or in a combination of two or more. Among them, it is preferable to use vinylene carbonate, vinylethylene carbonate or divinylethylene carbonate because they can form a strong coating film on the negative electrode that will not easily come off the electrode. In these compounds, some hydrogen atoms may be replaced with fluorine atoms. However, forming an excessive coating film causes an increase in impedance. Accordingly, from the viewpoint of improving the charge/discharge efficiency and suppressing impedance, it is preferable that the content of these compounds in the whole non-aqueous solvent is 0.5 to 10 vol %.

The non-aqueous electrolyte may contain a benzene derivative. Benzene derivatives decompose in the event of an overcharge, and form a coating film on an electrode, so they have a function of deactivating the battery. As the benzene derivative, a known benzene derivative containing a phenyl group and a cyclic compound group adjacent to the phenyl group can be used. Examples of the cyclic compound group include a phenyl group, a cyclic ether group, a cyclic ester group, a cycloalkyl group, a phenoxy group, and the like. Examples of such a benzene derivative include cyclohexylbenzene, biphenyl, diphenyl ether, and the like. They may be used alone or in a combination of two or more. The benzene derivative content in the non-aqueous electrolyte is preferably 0.5 parts by volume or more and 10 parts by volume or less relative to 100 parts by volume of the non-aqueous solvent.

The non-aqueous electrolyte contains a lithium salt. Examples of lithium salts include $LiPF_6$, $LiClO_4$, $LiBF_4$, $LiAlCl_4$, $LiSbF_6$, LiSCN, $LiCF_3SO_3$, $LiCF_3CO_2$, Li(CF$_3$SO$_2$)$_2$, LiAsF$_6$, lithium lower aliphatic carboxylate, LiCl, LiBr, LiI, boric acid salts, imide salts, and the like. Examples of boric acid salts include lithium chloroborane, lithium bis(1,2-benzenediolate(2-)-O,O')borate, lithium bis (2,3-naphthalenediolate(2-)-O,O')borate, lithium bis(2,2'-biphenyldiolate(2-)-O,O')borate, lithium bis(5-fluoro-2-olate-1-benzenesulfonyl-O,O')borate, and the like. Examples of imide salts include lithium bis(trifluoromethane sulfonyl)imide (LiN(CF$_3$SO$_2$) 2), lithium(trifluoromethane sulfonyl nonafluorobutane sulfonyl)imide (LiN(CF$_3$SO$_2$)(C$_4$F$_9$SO$_2$)), lithium bis(pentafluoroethane sulfonyl)imide (LiN (C$_2$F$_5$SO$_2$)$_2$), and the like. They may be used alone or in a combination of two or more. The concentration of the lithium salt in the non-aqueous electrolyte is, for example, 0.7 to 3 mol/L.

It is preferable that the lithium salt contains at least lithium bis(pentafluoroethane sulfonyl)imide (LiN (C$_2$F$_5$SO$_2$)$_2$). Lithium bis(pentafluoroethane sulfonyl)imide acts like a surface-active agent. Accordingly, the wettability of the non-aqueous electrolyte for the binder and polyamide contained in the porous film is improved, the occurrence of a local voltage increase in the electrodes becomes unlikely, and the number of leached metal cations is reduced. In addition, lithium bis (pentafluoroethane sulfonyl)imide, when reduced at the negative electrode, forms an inorganic coating film in a good quality, such as LiF. Accordingly, it is possible to prevent metal cations that have leached out from the positive electrode from depositing on the negative electrode.

The amount of lithium bis(pentafluoroethane sulfonyl)imide in the whole lithium salt is preferably 25 to 100 mol %, and more preferably 50 to 100 mol % from the viewpoint of sufficiently obtaining the effect of improved wettability of the non-aqueous electrolyte for the binder and polyamide contained in the porous film.

In the present invention, the non-aqueous electrolyte secondary battery may or may not include a separator. In other words, the battery may be formed by interposing only a porous film between the positive electrode and the negative electrode. In this case, the porous film takes on a role of preventing the positive electrode and the negative electrode from short circuiting.

As the separator, it is preferable to use a porous resin sheet. As the resin constituting the separator, it is preferable to use a polyolefin. Example of a polyolefin includes polyethylene and polypropylene.

As the separator, it is also possible to use a sheet, a non-woven fabric, a woven fabric, or the like made of polyamide, polyamide imide, glass fiber or the like.

It is preferable that the separator has ionic permeability, mechanical strength and insulating properties, and is a microporous sheet. The thickness of the separator can be, but is not limited to, for example, 10 to 300 µm from the viewpoint of suppressing an excessive increase in impedance.

The porous film that contains an inorganic oxide will be described in detail.

As for the inorganic oxide, it is preferable that the oxygen atoms included in the inorganic oxide have a high electron density and the inorganic oxide has superior chemical stability when the battery is in use. It is preferable to use, for example, alumina, titania, zirconia, magnesia, silica and the like. The inorganic oxide is powdered with a volume based median size of preferably 0.01 to 10 µm, and more preferably 0.05 to 5 µm. These inorganic oxides may be used alone, or a plurality of them may be combined for use. For example, by mixing a plurality of inorganic oxides, a monolayer porous film containing the mixture can be formed. It is also possible to laminate films containing different inorganic oxides.

The porous film containing an inorganic oxide may further contain a binder. There is no particular limitation on the binder, and for example, a resin material, such as a fluorocarbon resin, acrylic resin and rubber particles, can be used. As the fluorocarbon resin, for example, polyvinylidene fluoride (PVDF), polytetrafluoroethylene (PTFE), or the like can be used. As the acrylic resin, for example, BM-720H available from Zeon Corporation, Japan, or the like can be used. Examples of rubber particles include styrene-butadiene rubber, modified acrylonitrile rubber particles (e.g., BM-500B available from Zeon Corporation, Japan), and the like. It is also possible to use polyether sulfone, polyvinyl pyrrolidone, or the like as a binder.

The porous film containing an inorganic oxide is produced as follows, for example.

An inorganic oxide, a binder and optionally a thickener are mixed using a double arm kneader or the like to prepare a porous film paste. The obtained porous film paste is applied to, for example, the surface of an electrode or separator, and is dried to form a porous film.

There is no particular limitation on the method of applying the paste. For example, the paste can be applied in the same manner as a conventional method using a doctor blade, die coater, or the like.

When PTFE or BM-500B is used as a binder, it is preferable that the porous film paste further contains a thickener from the viewpoint of adjusting the viscosity of the paste. There is no particular limitation on the thickener as well. Examples include carboxymethyl cellulose (CMC), polyethylene oxide (PEO), modified acrylonitrile rubber (e.g., BM-720H available from Zeon Corporation, Japan), and the like.

The amount of binder in the total of the inorganic oxide and binder contained in the porous film is preferably 1 to 20 wt %. When the amount of binder is less than 1 wt %, the strength of the porous film may decrease. When the amount of binder exceeds 20 wt %, the porosity of the porous film decreases. As a result, the lithium ion conductivity of the porous film may decrease. From the viewpoint of achieving a good balance between the strength and the lithium ion conductivity of the porous film, it is more preferable that the amount of binder is 2 to 10 wt %.

The thickness of the porous film containing an inorganic oxide is preferably 0.5 to 50 µm, and more preferably 2 to 10 µm when a separator is included. When a separator is not included, the thickness of the porous film containing an inorganic oxide is preferably 10 to 50 µm, and more preferably 15 to 30 µm. When the thickness of the porous film is less than 0.5 µm, the amount of inorganic oxide contained in the porous film becomes relatively small. As a result, the effect of trapping metal cations may not be sufficiently obtained. Conversely, when the thickness exceeds 50 µm, due to the thickness of the porous film, a spacing between the positive electrode and the negative electrode, which are provided on both sides of the porous film, increases. As a result, output characteristics may decrease.

Next, the porous film containing a polyamide will be described in detail.

The porous film containing a polyamide is made of a polyamide, or contains a polyamide as a primary component. The porous film containing a polyamide is more flexible than the porous film containing an inorganic oxide. This is because a heat-resistance resin has more flexibility than an inorganic oxide. Accordingly, the porous film containing a polyamide can follow the expansion and contraction of the electrode plates during charge and discharge, and can retain high heat resistance. It is preferable that the polyamide contains an aromatic polyamide (aramid) because high heat resistance can be obtained.

The porous film containing a polyamide can contain, for example, less than 80 wt % of an inorganic oxide. The inclusion of an inorganic oxide provides a porous film having a superior balance between flexibility and durability. In this case, the polyamide contributes to the heat resistance and flexibility of the porous film, and the inorganic oxide having a high mechanical strength contributes to its durability. The inclusion of an inorganic oxide in the porous film containing a polyamide improves the high output characteristics of the battery. Although the details are not known, it is believed that this is because the porous structure of the porous film is optimized by the synergistic effect between its flexibility and its durability. From the viewpoint of securing good high output characteristics, it is desirable that the porous film containing a polyamide contains 25 wt % to 75 wt % of inorganic oxide.

The porous film containing a polyamide can be produced as follows, for example.

A solution in which a polyamide is dissolved in a solvent is applied onto the surface of at least one of the positive electrode, the negative electrode and the separator, and then dried to remove the solvent. The solvent is preferably, but not limited to, a polar solvent, such as N-methyl-2-pyrrolidone. In the solution, 33 to 300 parts by weight of an inorganic oxide may be dispersed per 100 parts by weight of polyamide. In this manner, a porous film containing a polyamide is obtained.

The thickness of the porous film containing a polyamide is preferably 0.5 to 50 µm, and more preferably 2 to 10 µm in the case where a separator is included. In the case where a separator is not included, the thickness of the porous film containing a polyamide is preferably 10 to 50 µm, and more preferably 15 to 30 µm. When the thickness of the porous film containing a polyamide is less than 0.5 µm, the amount of polyamide contained in the porous film becomes relatively small. As a result, the effect of trapping metal cations may not be sufficiently obtained. Conversely, when the thickness exceeds 50 µm, due to the thickness of the porous film, a spacing between the positive electrode and the negative electrode, which are provided on both sides of the porous film, increases. As a result, output characteristics may decrease.

The porous film containing an inorganic oxide may be formed on an electrode surface or separator surface. Forming the porous film on either surface provides the effect of the present invention.

In the case of forming the porous film containing an inorganic oxide on the surface of the separator, it is sufficient that the porous film is formed on at least one side of the separator, but it may be formed on both sides of the separator.

When the porous film containing an inorganic oxide is formed on the surface of the separator, the inorganic oxide contained in the porous film enters the pores of the separator, which may inhibit lithium ions from passing through the separator. Accordingly, it is preferable to form the porous film on an electrode surface. In the case of forming the porous film on an electrode surface, it is sufficient that the porous film is formed on at least one side of an electrode, but the porous film is preferably formed on both sides of an electrode.

When forming the porous film on the negative electrode, however, metal cations may be reduced, before being trapped in trap sites, near the interface between the negative electrode material mixture layer and the porous film. The reduced metal cations deposit on the surface of the negative electrode.

Accordingly, it is more preferable to form the porous film on at least one side of the positive electrode.

The porous film containing a polyamide may be formed on an electrode surface or separator surface. However, for the sake of convenience, it is preferable to form the porous film containing a polyamide on the separator surface.

A positive electrode contains a positive electrode active material as an essential component, and optionally a binder, a conductive material, and the like. The positive electrode is produced as follows, for example.

A positive electrode material mixture paste is prepared by mixing a positive electrode active material, a positive electrode binder, a conductive material and a dispersing medium. As the dispersing medium, for example, dehydrated N-methyl-2-pyrrolidone (NMP) can be used. The positive electrode material mixture paste is applied onto a positive electrode current collector, and then dried to form a positive electrode material mixture layer. This can be used as a positive electrode.

As the positive electrode current collector, for example, a sheet or foil containing stainless steel, aluminum, titanium or the like can be used. The thickness of the sheet or foil is, but is not limited to, for example, 1 to 500 µm.

The positive electrode active material contains a transition metal oxide capable of absorbing and desorbing lithium ions. Examples of such a transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (where M is at least one selected from the group consisting of Na, Mg, Sc, Y, Mn, Fe, Co, Ni, Cu, Zn, Al, Cr, Pb, Sb and B, and x=0 to 1.2, y=0 to 0.9, and z=2.0 to 2.3), and the like. The value of x can increase or decrease during charge and discharge. The present invention is useful particularly when the positive electrode active material contains Mn, Co or Ni.

As the transition metal oxide, it is particularly preferable to use $Li_xNi_{1-y}M_yO_z$ (where M includes Co and Al, and $0 \leq x \leq 1.2$, $0.1 \leq y \leq 0.3$ and $2 \leq z \leq 2.3$ are satisfied). This transition metal oxide has relatively high thermal stability. Also, NiO, which is a metal oxide, is produced on the surface of $Li_xNi_{1-y}M_yO_z$. The NiO acts as an initiator to polymerize part of EC contained in the non-aqueous solvent on the surface of the positive electrode active material, forming a thin coating film on the positive electrode. It is presumed that this coating film suppresses the leaching of metal cations from the positive electrode.

A negative electrode contains a negative electrode active material as an essential component, and optionally a binder, a conductive material, a thickener and the like. The negative electrode is produced as follows, for example.

A negative electrode material mixture paste is prepared by mixing a negative electrode active material, a negative electrode binder, and an appropriate amount of dispersing medium. As the dispersing medium, for example, water can be used. The negative electrode material mixture paste is applied onto a negative electrode current collector, and then dried to form a negative electrode material mixture layer. This can be used as a negative electrode. The negative electrode material mixture paste may contain a thickener. As the thickener, for example, carboxymethyl cellulose or the like can be used.

As the negative electrode current collector, for example, a sheet or foil containing stainless steel, nickel, copper or the like can be used. The thickness of the sheet or foil is, for example, 1 to 500 µm as with the positive electrode current collector.

The negative electrode active material contains a material capable of absorbing and desorbing lithium ions, metallic lithium, and the like. As the material capable of absorbing and desorbing lithium ions, for example, a carbon material, metal fiber, alloy, tin compound, silicon compound, nitride or the like can be used. Examples of carbon materials include: graphites such as natural graphite (flake graphite, etc.) and artificial graphite; carbon black such as acetylene black, ketjen black, channel black, furnace black, lamp black and thermal black; and carbon fiber.

As the binder used in the positive electrode material mixture or the negative electrode material mixture, for example, polyethylene, polypropylene, a fluorocarbon resin, rubber particles, and the like can be used. Examples of the fluorocarbon resin include polytetrafluoroethylene (PTFE), polyvinylidene fluoride (PVDF), tetrafluoroethylene-hexafluoropropylenecopolymer (FEP), vinylidene fluoride-hexafluoropropylenecopolymer, and the like. Examples of rubber particles include styrene-butadiene rubber, acrylonitrile rubber, and the like. Among them, the positive electrode binder preferably contains fluorine from the viewpoint of improving oxidation resistance, and the negative electrode binder preferably does not contain fluorine from the viewpoint of improving reduction resistance.

As the conductive material, for example, carbon black, graphite, carbon fiber, metal fiber, and the like can be used. Examples of carbon black include acetylene black, ketjen black, channel black, furnace black, lamp black, thermal black, and the like.

Figure 2:
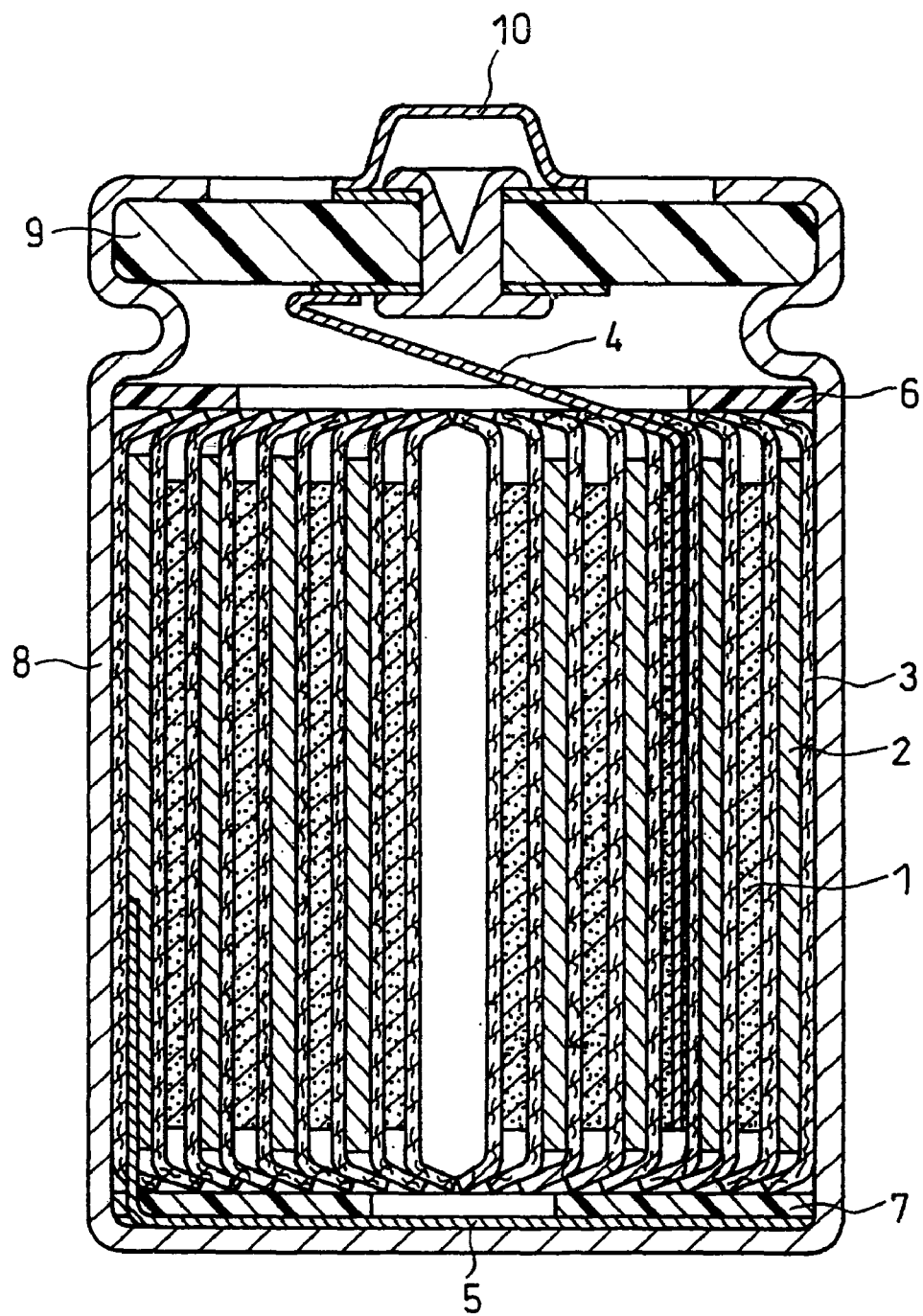
FIG. 2 is a vertical cross-sectional view of a cylindrical non-aqueous electrolyte secondary battery according to an embodiment of the present invention.

The case in which a porous film is formed on the positive electrode will be described with reference to FIG. 2. FIG. 2 is a vertical cross-sectional view of a cylindrical non-aqueous electrolyte secondary battery according to an embodiment of the present invention.

The cylindrical non-aqueous electrolyte secondary battery includes an electrode group in which a positive electrode 1 having a porous film and a negative electrode 2 are spirally wound with a separator 3 interposed therebetween. The electrode group is housed in a battery case 8. The battery case 8 has, for example, an inner surface plated with nickel. The battery case 8 is made of, for example, iron. The positive electrode 1 and a sealing plate 9 are connected via a positive electrode lead 4. The sealing plate 9 is equipped with a positive electrode terminal 10. The positive electrode lead 4 is made of, for example, aluminum. The negative electrode 2 and the bottom of the battery case 8 that also serves as a negative electrode terminal are connected via a negative electrode lead 5. The negative electrode lead 5 is made of, for example, nickel. An upper insulating plate 6 and a lower insulating plate 7 are disposed on the top and bottom of the electrode group such that they sandwich the electrode group.

A non-aqueous electrolyte is injected into the battery case 8 including the electrode group. After that, the opening of the battery case 8 is hermetically sealed with the sealing plate 9. In this manner, a non-aqueous electrolyte secondary battery is obtained.

In the case of forming a porous film on the negative electrode or separator, a non-aqueous electrolyte secondary battery can be produced in the same manner as described above.

EXAMPLES

Hereinafter, the present invention will be described in detail with reference to examples.

Example 1

(i) Preparation of Non-Aqueous Electrolyte

A non-aqueous electrolyte was prepared by dissolving a lithium salt in a non-aqueous solvent. As the lithium salt, $LiPF_6$ was used. The concentration of $LiPF_6$ in the non-aqueous electrolyte was 1.0 mol/L. As the non-aqueous solvent, ethylene carbonate (EC), ethyl methyl carbonate (EMC), dimethyl carbonate (DMC), propylene carbonate (PC), γ-butyrolactone (GBL), and γ-valerolactone (GVL) were used. A non-aqueous solvent was obtained by mixing them at the volume ratio shown in Table 1.

(ii) Separator

As a separator, a 20 μm thick microporous polyethylene sheet (available from Asahi Kasei Chemicals Corporation) was used.

(iii) Production of Positive Electrode

A positive electrode material mixture paste was prepared by mixing 85 parts by weight of lithium cobalt oxide powder (volume based median size: 10 μm, available from Tanaka Chemical Corporation) as a positive electrode active material, parts by weight of acetylene black (available from Denki Kagaku Kogyo K.K.) as a conductive material, 5 parts by weight of polyvinylidene fluoride resin (available from Kureha Corporation) as a binder, and 40 parts by weight of dehydrated N-methyl-2-pyrrolidone (NMP) as a dispersing medium. The positive electrode material mixture paste was applied onto a positive electrode current collector (thickness: 15 μm) made of an aluminum foil using a comma coater. After that, the positive electrode material mixture was dried at 120° C. for 5 minutes, and then rolled to form a positive electrode material mixture layer. The thickness of the positive electrode material mixture layer was 160 μm.

(iv) Production of Negative Electrode

An artificial graphite powder (volume based median size: 20 μm, available from Hitachi Chemical Co., Ltd.) as a negative electrode active material in an amount of 100 parts by weight was mixed with 1 part by weight of polyethylene resin (available from Mitsui Chemicals, Inc.) as a binder, and 1 part by weight of carboxymethyl cellulose (available from Daiichi Kogyo Seiyaku Co., Ltd.) as a thickener. After that, an appropriate amount of water was added thereto, and then kneaded. In this manner, a negative electrode material mixture paste was prepared. The negative electrode material mixture paste was applied onto a negative electrode current collector (thickness: 10 μm) made of a copper foil, and then the negative electrode material mixture was dried at 100° C. for 5 minutes, and rolled to form a negative electrode material mixture layer. The thickness of the negative electrode material mixture layer was 160 μm.

(v) Formation of Porous Film

A porous film paste was prepared by mixing 97 parts by weight of alumina (volume based median size: 0.3 μm) as an inorganic oxide, 37.5 parts by weight of BM-720H (an NMP solution containing 8 wt % of modified acrylonitrile rubber) available from Zeon Corporation, Japan, as a binder, and an appropriate amount of NMP using a double arm kneader. The porous film paste was applied onto the positive electrode material mixture layer formed on both sides of the positive electrode so as to have a thickness of 5 μm, and then dried at 120° C. for 10 minutes. The coating films were further dried at 120° C. in vacuum under a reduced pressure for 10 hours to form porous films. The thickness of each porous film was 5 μm.

(vi) Production of Cylindrical Battery

A cylindrical battery as shown in FIG. 2 was produced.

An electrode group was produced by spirally winding a positive electrode 1 having a porous film and a negative electrode 2 with a separator 3 interposed therebetween. The electrode group was then housed in an iron battery case 8 with its inner surface plated with nickel. The positive electrode 1 and a sealing plate 19 equipped with a positive electrode terminal 10 were connected with a positive electrode lead 4 made of aluminum. The negative electrode 2 and the bottom of the battery case 8 were connected via a negative electrode lead 5 made of nickel. An upper insulating plate 6 and a lower insulating plate 7 were disposed so as to sandwich the electrode group. A non-aqueous electrolyte was injected into the battery case 8 including the electrode group, and the opening of the battery case 8 was hermetically sealed with the sealing plate 9.

(vii) Evaluation of Battery

[Measurement of Amount of Metal Deposited on Negative Electrode After Storage]

The battery produced in the above-described manner was charged. Charging conditions were constant current-constant voltage charge with a maximum current of 1050 mA and an upper-limit voltage of 4.2 V for 2 hours and 30 minutes. After that, the battery was stored in an environment of 85° C. for 72 hours. The battery after storage was disassembled, and a 2×2 cm piece was cut from the center portion of the negative electrode, and then washed with ethyl methyl carbonate (EMC) three times. Acid was added to the washed negative electrode, and then heated to dissolve the negative electrode. Subsequently, undissolved matter was filtrated out, and a prescribed amount was weighed. This was used as a measurement sample. The measurement sample was subjected to ICP optical emission spectroscopy using VISTA-RL available from VARIAN, Inc. The amount of deposited metal was determined by converting the amount of Co contained in the measurement sample into the amount per gram of the negative electrode. The results are shown in Table 1.

[Measurement of Capacity Recovery Rate After Storage]

The discharge capacity at the rate of 1 C at 20° C. was measured for the battery before and after the above storage. The rate of discharge capacity after storage to discharge capacity before storage was determined in percent, which was defined as the capacity recovery rate after high temperature storage. The results are shown in Table 1.

In the above, the charging conditions were a constant current-constant voltage charge with a maximum current of 1050 mA and an upper-limit voltage of 4.2 V for 2 hours and 30 minutes, and the discharging conditions were a constant current discharge with a discharge current of mA and an end-of-discharge voltage of 3.0 V.

Comparative Example 1

Batteries were produced in the same manner as in Example 1, except that a non-aqueous solvent whose EC content was less than 5 vol % as shown in Table 2 was used. Then, an evaluation was made.

Comparative Example 2

Batteries were produced in the same manner as in Example 1, except that a non-aqueous solvent whose EC content was above 15 vol % as shown in Table 2 was used. Then, an evaluation was made.

Comparative Example 3

Batteries were produced in the same manner as in Example 1, except that a non-aqueous solvent whose EC content was 10 vol % as shown in Table 2 was used, and that no porous film was formed on the positive electrode active material. Then, an evaluation was made.

The results of Comparative Examples 1, 2 and 3 are shown in Table 2.

TABLE 1

|  | Non-aqueous Solvent (volume ratio) | Amount of Deposited Metal after Storage (µg/g) | Capacity Recovery Rate after Storage (%) |
| --- | --- | --- | --- |
| Ex. 1 | EC:EMC:DMC = 5:10:85 | 13 | 80.3 |
|  | EC:EMC:DMC = 8:10:82 | 9.7 | 82.3 |
|  | EC:EMC:DMC = 10:10:80 | 8.8 | 84.1 |
|  | EC:EMC:DMC = 12:10:78 | 10 | 82.2 |
|  | EC:EMC:DMC = 15:10:75 | 14 | 80.6 |
|  | EC:EMC:DEC = 5:75:20 | 15 | 80.2 |
|  | EC:EMC:DEC = 8:72:20 | 11 | 81.6 |
|  | EC:EMC:DEC = 10:70:20 | 9.0 | 83.4 |
|  | EC:EMC:DEC = 12:68:20 | 10 | 82.0 |
|  | EC:EMC:DEC = 15:65:20 | 15 | 80.1 |
|  | EC:EMC:DMC = 10:20:70 | 9.1 | 83.0 |
|  | EC:EMC:DMC = 10:30:60 | 9.3 | 82.7 |
|  | EC:PC:DMC = 10:10:80 | 9.8 | 82.1 |
|  | EC:GBL:DMC = 10:10:80 | 12 | 81.0 |
|  | EC:GVL:DMC = 10:10:80 | 14 | 80.3 |

TABLE 2

|  | Non-aqueous Solvent (volume ratio) | Porous Film | Amount of Deposited Metal after Storage (µg/g) | Capacity Recovery Rate after Storage (%) |
| --- | --- | --- | --- | --- |
| Comp. Ex. 1 | EC:EMC:DMC = 2:10:88 | Included | 20 | 63.8 |
|  | EC:EMC:DMC = 4:10:86 |  | 17 | 76.7 |
|  | EC:EMC:DEC = 2:78:20 |  | 21 | 62.0 |
|  | EC:EMC:DEC = 4:76:20 |  | 18 | 75.9 |
| Comp. Ex. 2 | EC:EMC:DMC = 16:10:74 |  | 18 | 74.4 |
|  | EC:EMC:DMC = 20:10:70 |  | 22 | 65.1 |
|  | EC:EMC:DEC = 16:64:20 |  | 17 | 75.0 |
|  | EC:EMC:DEC = 20:60:20 |  | 24 | 63.3 |
| Comp. Ex. 3 | EC:EMC:DMC = 10:10:80 | Not Included | 28 | 58.5 |
|  | EC:EMC:DEC = 10:70:20 |  | 30 | 56.2 |

In the batteries of Example 1 in which a porous film containing an inorganic oxide was formed on the positive electrode and a non-aqueous solvent with an EC content of 5 to vol % was used, the amount of metal deposited on the negative electrode after storage decreased as compared to Comparative Examples 1 to 3. Also, the batteries obtained in Example 1 exhibited a good capacity recovery rate after storage.

When the EC content of the non-aqueous solvent is 5 to 15 vol %, the porous film containing an inorganic oxide is wetted sufficiently, so it is presumed that the voltage is leveled over the entire area of the electrodes (local voltage increase is suppressed), and that a sufficient number of EC molecules are present in the porous film containing an inorganic oxide. Thus, metal cations that had leached out from the positive electrode during high temperature storage were trapped in the areas (trap sites) surrounded by the oxygen atoms of the inorganic oxide contained in the porous film and the oxygen atoms contained in the carbonyl groups of EC.

In Comparative Examples 1 to 3, the amount of metal deposited on the negative electrode after storage increased, and the capacity recovery rate after storage decreased. In Comparative Example 1, presumably, because the EC content of the non-aqueous solvent was small, the number of EC molecules present in the porous film decreased. Thus, the porous film could not sufficiently trap metal cations that had leached out from the positive electrode during high temperature storage.

In Comparative Example 2, presumably, because the EC content of the non-aqueous electrolyte was large, the wettability of the porous film for the non-aqueous electrolyte was low. Thus, voltage increased locally in the positive electrode and the negative electrode, and as a result, a very large number of metal cations leached out from the positive electrode during high temperature storage, and the porous film was unable to trap all of them.

In Comparative Example 3, because the batteries did not include a porous film, metal cations that had leached out from the positive electrode were not trapped, so good battery characteristics were not obtained.

Example 2

First, 69 g of dried anhydrous calcium chloride was added to 1 kg of NMP, and then heated to 80° C. in a reaction vessel to complete dissolution. The obtained calcium chloride-containing NMP solution was returned to room temperature, and then, 31 g of paraphenylenediamine was added and completely dissolved. After that, the reaction vessel was placed in a constant temperature chamber set to 20° C., and 57 g of dichloro terephthalate was added dropwise to the NMP solution over one hour. The NMP solution was then left in the constant temperature chamber set to 20° C. for 1 hour to allow polymerization to proceed and, thereby, polyparaphenylene terephthalamide (hereinafter simply referred to as PPTA) was synthesized.

After completion of the reaction, the NMP solution (polymerization solution) was taken out from the constant temperature chamber and placed in a vacuum chamber, where agitation was performed under a reduced pressure for 30 minutes for degassing. The obtained polymerization solution was diluted with a calcium chloride-containing NMP solution to prepare a polyamide-containing NMP solution having a PPTA concentration of 1.5 wt %.

The obtained polyamide NMP solution was applied onto one side of a separator with a doctor blade, and dried with hot air set to 80° C. (air velocity: 0.5 m/sec). After that, the polyamide film was washed sufficiently with pure water so as to remove calcium chloride and to form micropores in the film, and then dried. In this manner, a porous film containing a polyamide was formed on one side of a separator. The porous film containing a polyamide had a thickness of 5 μm.

Then, batteries were produced in the same manner as in Example 1, except that the porous film containing a polyamide formed on a separator was used instead of the porous film of Example 1, and then an evaluation was made. The results are shown in Table 3.

Comparative Example 4

Batteries were produced in the same manner as in Example 2, except that a non-aqueous solvent whose EC content was less than 5 vol % as shown in Table 4 was used. Then, an evaluation was made.

Comparative Example 5

Batteries were produced in the same manner as in Example 2, except that a non-aqueous solvent whose EC content was above 15 vol % as shown in Table 4 was used. Then, an evaluation was made.

The results of Comparative Examples 4 and 5 are shown in Table 4.

TABLE 3

|  | Non-aqueous Solvent (volume ratio) | Amount of Deposited Metal after Storage (μg/g) | Capacity Recovery Rate after Storage (%) |
|---|---|---|---|
| Ex. 2 | EC:EMC:DMC = 5:10:85 | 14 | 80.2 |
|  | EC:EMC:DMC = 8:10:82 | 10 | 82.0 |
|  | EC:EMC:DMC = 10:10:80 | 9.0 | 83.9 |
|  | EC:EMC:DMC = 12:10:78 | 10 | 82.1 |
|  | EC:EMC:DMC = 15:10:75 | 15 | 80.1 |
|  | EC:EMC:DEC = 5:75:20 | 15 | 80.1 |
|  | EC:EMC:DEC = 8:72:20 | 11 | 81.3 |
|  | EC:EMC:DEC = 10:70:20 | 9.3 | 82.8 |
|  | EC:EMC:DEC = 12:68:20 | 12 | 81.7 |
|  | EC:EMC:DEC = 15:65:20 | 15 | 80.1 |
|  | EC:EMC:DMC = 10:20:70 | 9.4 | 82.6 |
|  | EC:EMC:DMC = 10:30:60 | 9.6 | 82.4 |
|  | EC:PC:DMC = 10:10:80 | 9.9 | 82.0 |
|  | EC:GBL:DMC = 10:10:80 | 13 | 80.5 |
|  | EC:GVL:DMC = 10:10:80 | 14 | 80.2 |

TABLE 4

| | Non-aqueous Solvent (volume ratio) | Amount of Deposited Metal after Storage (μg/g) | Capacity Rate after Rate after Storage (%) |
|---|---|---|---|
| Comp. Ex. 4 | EC:EMC:DMC = 2:10:88 | 22 | 62.0 |
| | EC:EMC:DMC = 4:10:86 | 18 | 75.9 |
| | EC:EMC:DEC = 2:78:20 | 23 | 60.6 |
| | EC:EMC:DEC = 4:76:20 | 20 | 73.1 |
| Comp. Ex. 5 | EC:EMC:DMC = 16:10:74 | 19 | 74.2 |
| | EC:EMC:DMC = 20:10:70 | 24 | 63.5 |
| | EC:EMC:DEC = 16:64:20 | 19 | 74.0 |
| | EC:EMC:DEC = 20:60:20 | 25 | 62.4 |

In the batteries of Example 2 including a separator having a porous film containing a polyamide and a non-aqueous solvent with an EC content of 5 to 15 vol %, the amount of metal deposited on the negative electrode after storage decreased as compared to Comparative Examples 4 and 5. Also, the batteries obtained in Example 2 exhibited a good capacity recovery rate after storage.

When the EC content of the non-aqueous solvent is 5 to 15 vol %, the porous film containing a polyamide is wetted sufficiently, so it is presumed that voltage is leveled over the entire area of electrodes (local voltage increase is suppressed), and that a sufficient number of EC molecules are present in the porous film containing a polyamide. Thus, metal cations that have leached out from the positive electrode during high temperature storage were trapped in the areas (trap sites) surrounded by the oxygen atoms contained in the amide groups of the polyamide and the oxygen atoms contained in the carbonyl groups of EC.

In Comparative Examples 4 and 5, the amount of metal deposited on the negative electrode after storage increased, and the capacity recovery rate after storage decreased. In Comparative Example 4, presumably, because the EC content of the non-aqueous solvent was small, the number of EC molecules present in the porous film containing a polyamide decreased. Thus, the porous film could not sufficiently trap metal cations that had leached out from the positive electrode during high temperature storage.

In Comparative Example 5, presumably, because the EC content of the non-aqueous electrolyte was large, the wettability of the porous film containing a polyamide for the non-aqueous electrolyte was low. Thus, the voltage increased locally over the positive electrode and the negative electrode, and as a result, a very large number of metal cations leached out from the positive electrode during high temperature storage and the porous film was unable to trap all of them.

Example 3

Batteries were produced in the same manner as in Example 1 except for the following points and an evaluation was made. The results are shown in Table 5. As the non-aqueous electrolyte, a mixture obtained by mixing a non-aqueous solvent mixture of EC, EMC and DMC (volume ratio: 10:10:80) with $LiPF_6$ was used. The concentration of $LiPF_6$ in the non-aqueous electrolyte was set to 1.0 mol/L as in Example 1. The porous film was formed, as shown in Table 5, on a positive electrode, a negative electrode or a separator. For the batteries in which the porous film was formed on an electrode, those with and without a separator were separately evaluated. In the case of the battery without a separator, the thickness of the porous film formed on one side of the electrode was set to 25 μm. When forming the porous film on a separator, the porous film was formed on both sides, the positive electrode-side surface or the negative electrode-side surface of a separator.

TABLE 5

| | Separator | Location of Porous Film | Thickness of Porous Film (μm) | Amount of Deposited Metal after Storage (μg/g) | Capacity Recovery Rate after Storage (%) |
|---|---|---|---|---|---|
| Ex. 3 | Included | Both surfaces of separator | 5 | 13 | 81.0 |
| | | Positive electrode side surface of separator | 5 | 10 | 82.2 |
| | | Negative electrode side surface of separator | 5 | 11 | 81.5 |
| | | Positive electrode material mixture layer | 5 | 8.8 | 84.1 |
| | | Negative electrode material mixture layer | 5 | 9.6 | 83.0 |
| | Not Included | Positive electrode material mixture layer | 25 | 9.5 | 83.2 |
| | | Negative electrode material mixture layer | 25 | 9.5 | 83.1 |

In Example 3, in every case, batteries with a small amount of metal deposited on the negative electrode after storage and a good capacity recovery rate after storage were obtained.

In particular, when the porous film was formed on an electrode, superior storage characteristics (capacity recovery rate) were obtained, as compared to when the porous film was formed on a separator. This is presumably because, when the porous film containing an inorganic oxide is provided on a separator, the inorganic oxide enters the pores of the separator, preventing lithium ions from passing through the separator, and causing a local voltage increase. As a result, the rate characteristics decreased slightly.

The best storage characteristics were obtained when the battery included a separator and the porous film was formed on the positive electrode material mixture layer. When the porous film was formed on the negative electrode material mixture layer, presumably, metal cations that had leached out from the positive electrode were reduced, before being trapped at the trap sites, near the interface between the negative electrode material mixture layer and the porous film, and, as a result, formed deposits.

Even when the battery did not include a separator, by interposing a porous film between the positive electrode and the negative electrode, superior storage characteristics were obtained. From this, it is clear that the porous film not only has an effect of trapping metal cations, but also functions as an insulating film that prevents the positive electrode and the negative electrode from short circuiting, similar to separators.

Example 4

Batteries were produced in the same manner as in Example 1, except that the following non-aqueous electrolytes were used. The non-aqueous electrolytes were prepared by mixing various non-aqueous solvents containing EC and sulfolane (SL) as shown in Table 6 with $LiPF_6$. The concentration of $LiPF_6$ in each non-aqueous electrolyte was set to 1.0 mol/L. Then, an evaluation was made. Here, the evaluation was made by setting the battery voltage for storage to 4.2 V, 4.3 V or 4.4 V. The results are shown in Table 6.

TABLE 6

|  | Non-aqueous Solvent (volume ratio) | Charge voltage | Amount of Deposited Metal after Storage (μg/g) | Capacity Recovery Rate after Storage (%) |
|---|---|---|---|---|
| Ex. 4 | EC:EMC:DMC = 10:10:80 | 4.2 V | 8.8 | 84.1 |
|  |  | 4.3 V | 17 | 76.5 |
|  |  | 4.4 V | 25 | 62.5 |
|  | EC:SL:DMC = 10:10:80 | 4.2 V | 9.2 | 83.0 |
|  |  | 4.3 V | 10 | 82.0 |
|  |  | 4.4 V | 12 | 81.3 |
|  | EC:SL:EMC = 10:10:80 | 4.2 V | 9.4 | 82.2 |
|  |  | 4.3 V | 11 | 81.7 |
|  |  | 4.4 V | 14 | 80.6 |
|  | EC:SL:EMC:DMC = 10:10:10:70 | 4.2 V | 9.1 | 83.1 |
|  |  | 4.3 V | 9.8 | 82.4 |
|  |  | 4.4 V | 12 | 81.1 |

As can be seen from Table 6, inclusion of sulfolane in the non-aqueous electrolyte of the battery with a porous film containing an inorganic oxide further reduced the amount of metal deposited on the negative electrode after storage when the battery was charged to a high voltage exceeding 4.2 V. Furthermore, it was found that, by including sulfolane in the non-aqueous electrolyte, a battery charged to a high voltage exhibits a better capacity recovery rate after storage.

Two reasons can be given for this. Firstly, because sulfolane has high oxidation resistance, the non-aqueous solvent was not oxidized and decomposed even when charged to a high voltage, so the leaching of metal cations was suppressed. Secondly, the oxygen atoms contained in the $SO_2$ groups of sulfolane also have a high electron density. These oxygen atoms and the oxygen atoms of the inorganic oxide form metal cation trapping sites. Thus, metal cations that had leached were trapped easily, preventing the metal cations from depositing on the negative electrode.

Example 5

Batteries were produced in the same manner as in Example 4, except that the same porous film containing a polyamide formed on a separator as used in Example 2 was used. Then, an evaluation was made. Here, the evaluation was made by setting the battery voltage for storage to 4.2 V, 4.3 V or 4.4 V. The results are shown in Table 7.

TABLE 7

|  | Non-aqueous Solvent (volume ratio) | Charge Voltage | Amount of Deposited Metal after Storage (μg/g) | Capacity Recovery Rate after Storage (%) |
|---|---|---|---|---|
| Ex. 5 | EC:EMC:DMC = 10:10:80 | 4.2 V | 9.0 | 83.9 |
|  |  | 4.3 V | 19 | 76.0 |
|  |  | 4.4 V | 27 | 61.3 |
|  | EC:SL:DMC = 10:10:80 | 4.2 V | 9.3 | 82.8 |
|  |  | 4.3 V | 11 | 81.8 |
|  |  | 4.4 V | 13 | 80.8 |
|  | EC:SL:EMC = 10:10:80 | 4.2 V | 9.7 | 81.7 |
|  |  | 4.3 V | 13 | 80.6 |
|  |  | 4.4 V | 15 | 80.1 |
|  | EC:SL:EMC:DMC = 10:10:10:70 | 4.2 V | 9.2 | 83.0 |
|  |  | 4.3 V | 10 | 82.2 |
|  |  | 4.4 V | 13 | 80.4 |

As can be seen from Table 7, even in the battery with a porous film containing a polyamide, by including sulfolane in the non-aqueous electrolyte, the amount of metal deposited on the negative electrode after storage when the battery was charged to a high voltage exceeding 4.2 V was further reduced. Furthermore, it was found that, even in the battery with a porous film containing a polyamide, by including sulfolane in the non-aqueous electrolyte, a battery charged to a high voltage exhibits a better capacity recovery rate after storage.

Example 6

Batteries were produced in the same manner as in Example 1, except that the following non-aqueous electrolytes were used. The non-aqueous electrolytes were prepared by mixing various non-aqueous solvents containing EC and fluoroethylene carbonate (FEC) as shown in Table 8 with $LiPF_6$. The concentration of $LiPF_6$ in each non-aqueous electrolyte was set to 1.0 mol/L. As the non-aqueous solvent, EC, EMC, DMC and fluoroethylene carbonate (FEC) were used. Then, an evaluation was made. The results are shown in Table 8.

TABLE 8

|  | Non-aqueous Solvent (volume ratio) | Amount of Deposited Metal after Storage (μg/g) | Capacity Recovery Rate after Storage (%) |
|---|---|---|---|
| Ex. 6 | EC:EMC:DMC = 10:10:80 | 8.8 | 84.1 |
|  | EC:FEC:EMC:DMC = 10:1:10:79 | 8.2 | 85.0 |
|  | EC:FEC:EMC:DMC = 10:2:10:78 | 7.7 | 86.8 |
|  | EC:FEC:EMC:DMC = 10:5:10:75 | 7.3 | 88.2 |
|  | EC:FEC:EMC:DMC = 10:10:10:70 | 6.8 | 85.1 |
|  | EC:EMC:DMC = 5:10:85 | 13 | 80.3 |
|  | EC:FEC:EMC:DMC = 5:5:10:80 | 9.1 | 84.0 |
|  | EC:EMC:DMC = 15:10:75 | 14 | 80.6 |
|  | EC:FEC:EMC:DMC = 15:5:10:70 | 9.0 | 84.1 |

It is clear from Table 8 that, by including FEC in the non-aqueous electrolyte of the battery with a porous film containing an inorganic oxide, the amount of metal deposited on the negative electrode after storage was further reduced, and an even better capacity recovery rate after storage was obtained. FEC has high wettability for the binder contained in the porous film. Accordingly, it is presumed that the addition of a small amount of FEC suppressed a local voltage increase in the electrode, and the number of leached metal cations was reduced. In addition, FEC forms a good coating film when reduced at the negative electrode. Presumably, this prevented the metal cations that had leached out from the positive electrode from depositing on the negative electrode.

Example 7

Batteries were produced in the same manner as in Example 6, except that the same porous film containing a polyamide formed on a separator as used in Example 2 was used instead of a porous film containing an inorganic oxide. Then, an evaluation was made. The results are shown in Table 9.

TABLE 9

|  | Non-aqueous Solvent (volume ratio) | Amount of Deposited Metal after Storage (μg/g) | Capacity Recovery Rate after Storage (%) |
|---|---|---|---|
| Ex. 7 | EC:EMC:DMC = 10:10:80 | 9.0 | 83.9 |
|  | EC:FEC:EMC:DMC = 10:1:10:79 | 8.5 | 84.5 |
|  | EC:FEC:EMC:DMC = 10:2:10:78 | 7.9 | 86.1 |
|  | EC:FEC:EMC:DMC = 10:5:10:75 | 7.4 | 88.0 |
|  | EC:FEC:EMC:DMC = 10:10:10:70 | 7.0 | 84.8 |
|  | EC:EMC:DMC = 5:10:85 | 14 | 80.2 |
|  | EC:FEC:EMC:DMC = 5:5:10:80 | 9.4 | 83.2 |
|  | EC:EMC:DMC = 15:10:75 | 15 | 80.1 |
|  | EC:FEC:EMC:DMC = 15:5:10:70 | 9.5 | 83.0 |

It is clear from Table 9 that, even in the battery with a porous film containing a polyamide, by including FEC in the non-aqueous electrolyte, the amount of metal deposited on the negative electrode after storage of the battery was further reduced and an even better capacity recovery rate after storage was obtained.

Example 8

Batteries were produced in the same manner as in Example 1, except that the following non-aqueous electrolytes were used. The non-aqueous electrolytes were prepared by dissolving $LiPF_6$ and/or lithium bis(pentafluoroethane sulfonyl)imide (LiBETI) at a concentration as shown in Table 10 in a non-aqueous solvent mixture of EC, EMC and DMC (volume ratio: 10:10:80). The concentration of the lithium salt in each non-aqueous electrolyte was set to 1.0 mol/L. Then, an evaluation was made. The results are shown in Table 10.

TABLE 10

|  | Concentration of $LiPF_6$ (mol/L) | Concentration of LiBETI (mol/L) | Amount of Deposited Metal after Storage (μg/g) | Capacity Recovery Rate after Storage (%) |
|---|---|---|---|---|
| Ex. 8 | 1.0 | 0 | 8.8 | 84.1 |
|  | 0.75 | 0.25 | 8.1 | 85.0 |
|  | 0.5 | 0.5 | 7.7 | 86.8 |
|  | 0.25 | 0.75 | 7.5 | 87.7 |
|  | 0 | 1.0 | 7.4 | 88.0 |

It is clear from Table 10 that, in the battery with a porous film containing an inorganic oxide, by using LiBETI as a lithium salt, the amount of metal deposited on the negative electrode after storage of the battery was further reduced, and an even better capacity recovery rate after storage was obtained. Presumably, the wettability of the non-aqueous electrolyte for the binder contained in the porous film was improved because LiBETI has an effect similar to a surface-active agent. And, this made it difficult for a local voltage increase in the electrode to occur, and the number of leached metal cations was reduced. In addition, LiBETI also forms a good inorganic coating film, such as LiF, when reduced at the negative electrode. Presumably, this prevented the metal cations that had leached out from the positive electrode from depositing on the negative electrode.

Example 9

Batteries were produced in the same manner as in Example 8, except that that the same porous film containing a polyamide formed on a separator as used in Example 2 was used instead of a porous film containing an inorganic oxide. Then, an evaluation was made. The results are shown in Table 11.

TABLE 11

|  | Concentration of $LiPF_6$ (mol/L) | Concentration of LiBETI (mol/L) | Amount of Deposited Metal after storage (μg/g) | Capacity Recovery Rate after Storage (%) |
|---|---|---|---|---|
| Ex. 9 | 1.0 | 0 | 9.0 | 83.9 |
|  | 0.75 | 0.25 | 8.4 | 84.6 |
|  | 0.5 | 0.5 | 8.0 | 86.0 |
|  | 0.25 | 0.75 | 7.7 | 86.7 |
|  | 0 | 1.0 | 7.6 | 87.4 |

It is clear from Table 11 that, even in the battery with a porous film containing a polyamide, by using LiBETI as a lithium salt, the amount of metal deposited on the negative electrode after storage of the battery was further reduced, and an even better capacity recovery rate after storage was obtained.

Example 10

Batteries were produced in the same manner as in Example 1, except that the following non-aqueous electrolyte and positive electrode active materials were used. The non-aqueous electrolyte was prepared by dissolving LiPF6 at a concentration of 1.0 mol/L in a non-aqueous solvent mixture of EC, EMC and DMC (volume ratio: 10:10:80). As the positive electrode active materials, transition metal oxides as shown in Table 12 were used. Then, an evaluation was made. For the batteries containing $LiNi_{1-y}M_yO_2$ as a positive electrode active material, the amounts of Ni and Co were measured, and the total was used as the amount of metal deposited on the negative electrode. The results are shown in Table 12.

TABLE 12

|  | Positive Electrode Active Material | Amount of Deposited Metal after Storage (μg/g) | Capacity Recovery Rate after Storage (%) |
|---|---|---|---|
| Ex. 10 | $LiCoO_2$ | 8.8 | 84.1 |
|  | $LiNi_{0.6}Co_{0.4}O_2$ | 9.0 | 83.7 |
|  | $LiNi_{0.7}Co_{0.3}O_2$ | 8.1 | 85.8 |
|  | $LiNi_{0.8}Co_{0.2}O_2$ | 7.6 | 87.3 |
|  | $LiNi_{0.9}Co_{0.1}O_2$ | 7.9 | 86.6 |
|  | $LiNiO_2$ | 9.4 | 83.3 |
|  | $LiNi_{0.8}Co_{0.15}Al_{0.05}O_2$ | 7.2 | 88.2 |
|  | $LiNi_{0.82}Co_{0.15}Al_{0.03}O_2$ | 7.1 | 88.5 |
|  | $LiNi_{0.84}Co_{0.15}Al_{0.01}O_2$ | 7.4 | 88.0 |
|  | $LiNi_{0.845}Co_{0.15}Al_{0.005}O_2$ | 7.7 | 86.4 |

It is clear from Table 12 that, in the battery with a porous film containing an inorganic oxide, by using $LiNi_{1-y}M_yO_2$ (where M includes both Co and Al, and y=0.1 to 0.3) as a positive electrode active material, the amount of metal deposited on the negative electrode after storage of the battery was further reduced, and an even better capacity recovery rate after storage was obtained. $LiNi_{1-y}M_yO_2$ (where M includes both Co and Al, and y=0.1 to 0.3) has a relatively high thermal stability, and NiO is formed on its surface. Presumably, NiO acts as an initiator, and part of EC is polymerized on the surface of the positive electrode active material, forming a thin coating film. This coating film prevented metal cations from leaching out from the positive electrode.

Example 11

Batteries were produced in the same manner as in Example 10, except that the same porous film containing a polyamide formed on a separator as used in Example 2 was used instead of a porous film containing an inorganic oxide. Then, an evaluation was made. The results are shown in Table 13.

TABLE 13

|  | Positive Electrode Active Material | Amount of Deposited Metal after Storage (μg/g) | Capacity Recovery Rate after Storage (%) |
|---|---|---|---|
| Ex. 11 | $LiCoO_2$ | 9.0 | 83.9 |
|  | $LiNi_{0.6}Co_{0.4}O_2$ | 9.3 | 83.0 |
|  | $LiNi_{0.7}Co_{0.3}O_2$ | 8.3 | 84.7 |
|  | $LiNi_{0.8}Co_{0.2}O_2$ | 8.0 | 85.3 |
|  | $LiNi_{0.9}Co_{0.1}O_2$ | 8.3 | 84.5 |
|  | $LiNiO_2$ | 9.5 | 83.1 |
|  | $LiNi_{0.8}Co_{0.15}Al_{0.05}O_2$ | 7.4 | 87.9 |
|  | $LiNi_{0.82}Co_{0.15}Al_{0.03}O_2$ | 7.2 | 88.0 |
|  | $LiNi_{0.84}Co_{0.15}Al_{0.01}O_2$ | 7.7 | 86.5 |
|  | $LiNi_{0.845}Co_{0.15}Al_{0.005}O_2$ | 8.1 | 85.2 |

It is clear from Table 13 that, even in the battery with a porous film containing a polyamide, by using $LiNi_{1-y}M_yO_2$ (where M includes both Co and Al, and y=0.1 to 0.3) as a positive electrode active material, the amount of metal deposited on the negative electrode after storage of the battery was further reduced, and an even better capacity recovery rate after storage was obtained.

INDUSTRIAL APPLICABILITY

According to the present invention, it is possible to provide a non-aqueous electrolyte secondary battery with superior storage characteristics. In particular, the degradation of rate characteristics that occurs in a battery after high temperature storage can be suppressed.

The invention claimed is:

1. A non-aqueous electrolyte secondary battery comprising:
   a positive electrode that contains a transition metal oxide capable of absorbing and desorbing lithium ions;
   a negative electrode that is capable of absorbing and desorbing lithium ions;
   a separator and a porous film that are interposed between said positive electrode and said negative electrode; and
   a non-aqueous electrolyte, wherein:
   said separator is a resin porous sheet,
   said porous film contains an inorganic oxide and polyamide,
   said non-aqueous electrolyte contains a non-aqueous solvent and a lithium salt that is dissolved in said non-aqueous solvent, and
   said non-aqueous solvent contains 5 to 15 vol % of ethylene carbonate.

2. The non-aqueous electrolyte secondary battery in accordance with claim 1, wherein said porous film is carried on at least one of said positive electrode and said negative electrode.

3. The non-aqueous electrolyte secondary battery in accordance with claim 1, wherein said porous film is carried on said positive electrode.

4. The non-aqueous electrolyte secondary battery in accordance with claim 1, wherein said non-aqueous solvent contains sulfolane.

5. The non-aqueous electrolyte secondary battery in accordance with claim 1, wherein said non-aqueous solvent contains a compound that has a polarity lower than that of ethylene carbonate, and said compound is a chain carbonic acid ester.

6. The non-aqueous electrolyte secondary battery in accordance with claim 1, wherein said non-aqueous solvent contains fluoroethylene carbonate.

7. The non-aqueous electrolyte secondary battery in accordance with claim 1, wherein said lithium salt contains lithium bis(pentafluoroethane sulfonyl)imide.

8. The non-aqueous electrolyte secondary battery in accordance with claim 1, wherein said transition metal oxide is represented by a general formula: $Li_xNi_{1-y}M_yO_z$, where M includes Co and Al, and $0 \leq x \leq 1.2$, $0.1 \leq y \leq 0.3$ and $2 \leq z \leq 2.3$ are satisfied.

9. The non-aqueous electrolyte secondary battery in accordance with claim 1, wherein said porous film contains at least said polyamide, and said porous film is carried on said separator.

* * * * *